(12) United States Patent
Fang et al.

(10) Patent No.: US 12,536,988 B2
(45) Date of Patent: Jan. 27, 2026

(54) SPEECH SYNTHESIS METHOD AND APPARATUS, DEVICE, AND STORAGE MEDIUM

(71) Applicant: BEIJING SOGOU TECHNOLOGY DEVELOPMENT CO., LTD., Beijing (CN)

(72) Inventors: Peng Fang, Beijing (CN); Kai Liu, Beijing (CN); Wei Chen, Beijing (CN)

(73) Assignee: BEIJING SOGOU TECHNOLOGY DEVELOPMENT CO., LTD, Beijing (CN)

(*) Notice: Subject to any disclaimer, the term of this patent is extended or adjusted under 35 U.S.C. 154(b) by 441 days.

(21) Appl. No.: 18/201,105

(22) Filed: May 23, 2023

(65) Prior Publication Data

US 2023/0298564 A1    Sep. 21, 2023

Related U.S. Application Data

(63) Continuation of application No. PCT/CN2022/100747, filed on Jun. 23, 2022.

(30) Foreign Application Priority Data

Jul. 7, 2021 (CN) .......................... 202110769530.2

(51) Int. Cl.
*G10L 13/08* (2013.01)
*G10L 13/047* (2013.01)
(Continued)

(52) U.S. Cl.
CPC ............ *G10L 13/10* (2013.01); *G10L 13/047* (2013.01); *G10L 2013/105* (2013.01)

(58) Field of Classification Search
None
See application file for complete search history.

(56) References Cited

U.S. PATENT DOCUMENTS

2017/0345411 A1* 11/2017 Raitio .................. G10L 13/06
2020/0082805 A1* 3/2020 Zhang ................. G10L 13/027

FOREIGN PATENT DOCUMENTS

CN        108597492 A    9/2018
CN        111316352 A    6/2020
(Continued)

OTHER PUBLICATIONS

Tencent Technology, WO, PCT/CN2022/100747, Aug. 18, 2022, 5 pgs.

(Continued)

*Primary Examiner* — Shreyans A Patel
(74) *Attorney, Agent, or Firm* — Morgan, Lewis & Bockius LLP (57) ABSTRACT

Embodiments of this application provide a speech synthesis method performed by an electronic device. The method includes: acquiring a target text to be synthesized into a speech; generating hidden layer features and prosodic features of the target text, and predicting pronunciation duration of characters in the target text using an acoustic model corresponding to the target text; generating acoustic features corresponding to the target text based on the hidden layer features, the prosodic features and the pronunciation duration; and synthesizing a target speech corresponding to the target text according to the acoustic features. Using the solution provided by the embodiments of this application is beneficial to reducing the difficulty of speech synthesis.

17 Claims, 5 Drawing Sheets

(51) Int. Cl.
    *G10L 13/10*    (2013.01)
    *G10L 25/30*    (2013.01)

(56)         References Cited

FOREIGN PATENT DOCUMENTS

| | | | | |
|---|---|---|---|---|
| CN | 111862938 A | | 10/2020 | |
| CN | 111968618 A | * | 11/2020 | ............ G10L 25/30 |
| CN | 112151009 A | | 12/2020 | |
| CN | 112289304 A | | 1/2021 | |
| CN | 112435650 A | | 3/2021 | |
| CN | 112735378 A | | 4/2021 | |
| CN | 112786005 A | | 5/2021 | |
| CN | 112802446 A | * | 5/2021 | ............ G06N 3/045 |
| CN | 113066476 A | * | 7/2021 | ............ G10L 13/08 |
| CN | 113488022 A | | 10/2021 | |
| WO | WO 2020215551 A1 | | 10/2020 | |
| WO | WO 2021118543 A1 | | 6/2021 | |

OTHER PUBLICATIONS

Tencent Technology, IPRP, PCT/CN2022/100747, Dec. 14, 2023, 6 pgs.
Fanbo Meng et al., "The Sogou system for Blizzard Challenge", Proceedings of 2020 Joint Workshop for the Blizzard Challenge and Voice Conversion Challenge, Oct. 30, 2020, 3 pgs.
Tencent Technology, ISR, PCT/CN2022/100747, Aug. 18, 2022, 3 pgs.

\* cited by examiner

SPEECH SYNTHESIS METHOD AND APPARATUS, DEVICE, AND STORAGE MEDIUM

CROSS-REFERENCE TO RELATED APPLICATIONS

This application is a continuation application of PCT Patent Application No. PCT/CN2022/100747, entitled "SPEECH SYNTHESIS METHOD AND APPARATUS, DEVICE, AND STORAGE MEDIUM" filed on Jun. 23, 2022, which claims priority to Chinese Patent Application No. 202110769530.2, entitled "SPEECH SYNTHESIS METHOD AND APPARATUS" and filed on Jul. 7, 2021, all of which is incorporated by reference in embodiments of this application in its entirety.

FIELD OF THE TECHNOLOGY

Embodiments of this application relate to the technical field of speech processing, and in particular, to a speech synthesis method and apparatus, a device, and a storage medium.

BACKGROUND OF THE DISCLOSURE

Speech synthesis is a technology of generating corresponding audio based on text, which is widely used in video dubbing and other application scenarios.

Among the related technologies, speech synthesis can usually be realized based on phonemes. Phoneme-based speech synthesis needs to collect a large number of words and phonemes corresponding to the words as materials in advance to achieve text-to-speech conversion. It also needs to collect a large number of words and pause information corresponding to the words in advance as materials to achieve prosodic prediction of speech.

However, preprocessing of the words, the phonemes, the pause information and other materials requires a large amount of work, and speech synthesis based on the large number of materials usually has high requirements on the processing capacity of an electronic device, resulting in high difficulty in speech synthesis.

SUMMARY

Embodiments of this application provide a speech synthesis method and apparatus, a device and a storage medium, which can reduce the difficulty of speech synthesis. The solution includes:

an embodiment of this application discloses a speech synthesis method, where the method is executed by an electronic device, and the method includes:
acquiring a target text to be synthesized into a speech;
generating hidden layer features and prosodic features of the target text, and predicting pronunciation duration of characters in the target text using an acoustic model corresponding to the target text;
generating acoustic features corresponding to the target text based on the hidden layer features, the prosodic features and the pronunciation duration; and
synthesizing a target speech corresponding to the target text according to the acoustic features.

This embodiment of this application further discloses a speech synthesis apparatus, the apparatus including:
a text acquisition module, configured to acquire a target text to be synthesized into a speech;
a first feature generation module, configured to generate hidden layer features and prosodic features of the target text, and predict pronunciation duration of characters in the target text using an acoustic model corresponding to the target text;
a second feature generation module, configured to generate acoustic features corresponding to the target text based on the hidden layer features and the prosodic features of the target text, and the pronunciation duration; and
a speech synthesis module, configured to generate text speech corresponding to the target text according to the acoustic features.

This embodiment of this application further discloses a non-transitory computer-readable storage medium storing one or more programs, the one or more programs, when executed by one or more processing units of an electronic device, causing the electronic device to perform the speech synthesis method as described in the above aspect.

This embodiment of this application discloses an electronic device, including:
a memory, one or more processing units, and one or more programs, where the one or more programs are stored in the memory and executed by the one or more processing units for performing the speech synthesis method as described in the above aspect.

This embodiment of this application further discloses a computer program product, the computer program product including computer instructions that are stored in a computer-readable storage medium, where a processing unit of an electronic device reads the computer instructions from the computer-readable storage medium, and the computer instructions, when executed by the processing unit, cause the electronic device to execute the speech synthesis method as described in the above aspect.

According to the speech synthesis method of this embodiment of this application, the target text is acquired, the hidden layer features and the prosodic features of the target text are generated, to extract feature information associated with text characteristics and feature information associated with speech prosody based on the target text, and duration of each character in the target text is predicted, so as to carry out subsequent speech synthesis based on the characters; the acoustic features corresponding to the target text needed for speech synthesis are generated based on the hidden layer features and the prosodic features of the target text and the duration of each character in the target text; and the text speech corresponding to the target text is generated by using the acoustic features corresponding to the target text, so that there is no need to preprocess a lot of materials, and character-level speech synthesis is realized by extracting the hidden layer features and the prosodic features in the text and predicting the speech duration based on the characters. Moreover, the synthesized speech has relatively good quality, and the difficulty of speech synthesis can be reduced, so that users may apply the speech synthesis method to different scenarios according to actual needs, to meet personalized needs of the users.

By using the speech synthesis method of this embodiment of this application, the character-level speech synthesis is achieved by extracting the hidden layer features and the prosodic features in the text and predicting the speech duration based on the characters; under the condition of ensuring the quality of speech synthesis, the speech synthesis method does not need to preprocess a lot of materials compared with a phoneme-level speech synthesis solution, which is beneficial to reducing the difficulty of speech synthesis.

DESCRIPTION OF EMBODIMENTS

To make the foregoing objectives, features, and advantages of this application clearer and easier to understand, the following further describes this application in detail with reference to the accompanying drawings and specific implementations.

To reduce the difficulty of speech synthesis, an embodiment of this application uses a character-level speech synthesis method, which does not need to acquire phoneme input, but can directly predict duration of each character in to-be-synthesized text, and generate prosodic features corresponding to the target text. Thereafter, acoustic features corresponding to the target text are generated based on the duration of each character in the target text and the prosodic features of the target text, and finally speech corresponding to the target text is synthesized based on the acoustic features, which can make the process of speech synthesis simpler and reduce the difficulty of speech synthesis. In the face of a variety of different personalized needs, it can also be more convenient to realize support for the personalized needs.

The speech synthesis method according to this embodiment of this application may be executed by an electronic device with speech synthesis needs, which may be a mobile terminal with relatively weak computing power, such as a smart phone, a tablet computer, a vehicle-mounted terminal, a smart television, a wearable device, or a portable personal computer, may also be a non-mobile terminal with relatively strong computing power, such as a personal computer or a server. In a possible application scenario, the speech synthesis method according to this embodiment of this application may be applied to a video dubbing scenario. In this scenario, a video editing application may use this method to achieve automatic video dubbing. For example, after acquiring a voiceover copy corresponding to a video, the video editing application performs speech synthesis on the voiceover copy to obtain voiceover speech, thereby synthesizing the video and the voiceover copy based on a time axis, and realizing automatic video dubbing.

In another possible application scenario, the speech synthesis method according to this embodiment of this application may be applied to a barrier-free scenario. In this scenario, a visual impairment auxiliary device (for example, visually impaired glasses) for visually impaired people may be integrated with a speech synthesis function. In a working process, the visual impairment auxiliary device collects environment images by a camera, and recognizes the environment images, to obtain environment description text of a current environment, thereby further converting the environment description text into environment description speech by a speech synthesis technology, and then playing the environment description speech by a loudspeaker of the visual impairment auxiliary device, to remind the visually impaired people.

In other possible application scenarios, the speech synthesis method according to this embodiment of this application may also be applied to a book listening scenario. In this scenario, a server uses the method according to this embodiment of this application to perform speech synthesis on book listening text to obtain a book listening video, and publish the book listening video to a book listening application, so that a user can choose to listen to the book listening video. During speech synthesis, the server may synthesize, based on book listening text, the book listening videos of different languages, different tones and different styles for the user to choose to play.

Certainly, in addition to the above several possible application scenarios, the speech synthesis method according to this embodiment of this application may be applied to other scenarios needing to convert text into speech, which is not limited in this embodiment of this application.

Figure 1:
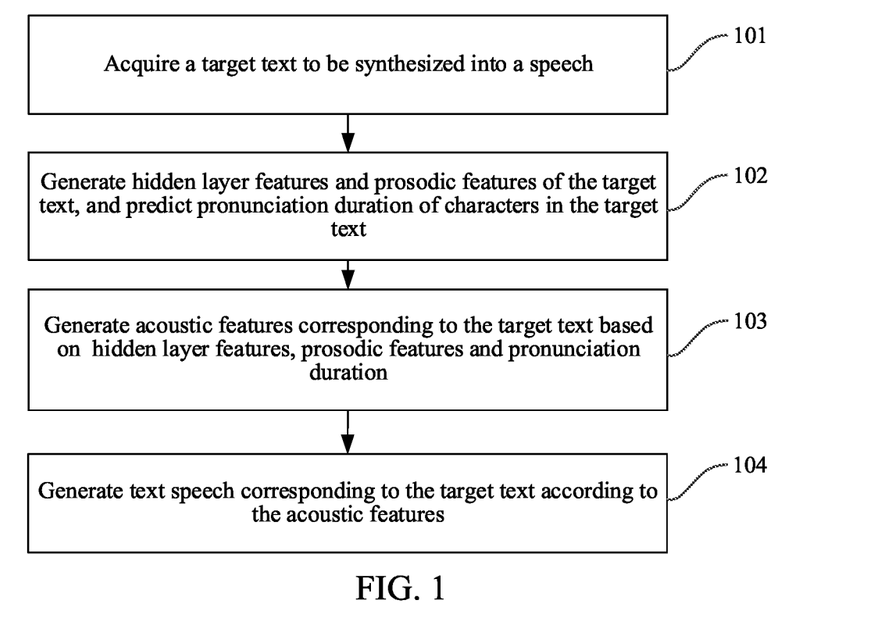
FIG. 1 is a flowchart of steps of a speech synthesis method according to an embodiment of this application.

Referring to FIG. 1, showing a flowchart of steps of a speech synthesis method embodiment according to this embodiment of this application, which may include the following steps:

Step 101. Acquire a target text to be synthesized into a speech.

In this embodiment of this application, if speech synthesis is needed, a user may submit to-be-synthesized text, and an electronic device may thus acquire the target text needing speech synthesis.

The to-be-synthesized text may be words, short sentences, long sentences, articles, etc., of a language, which is not limited in this application.

Step 102. Generate hidden layer features and prosodic features of the target text, and predict pronunciation duration of characters in the target text.

In this embodiment of this application, after acquiring the target text, the electronic device may extract feature information, which is associated with speech synthesis, in the target text, and generate hidden layer features of the target text. The hidden layer features may be associated with text characteristics such as character characteristics of the characters in the target text, character context association, or character emotion, which may usually be expressed in a vector form.

Generally speaking, after the hidden layer features of the target text are obtained, pronunciation, duration, tone and intonation of the characters in the text, as well as overall pronunciation rhythm of the text can be determined based on the features, such as the character characteristics of the target text, character context association, or character emotion, implicitly included in the hidden layer features; sound waveform features corresponding to the target text can be generated; and acoustic features can be obtained. However, if only the hidden layer features are used to generate the acoustic features, synthesized speech with relatively good effect cannot be obtained, and the synthesized speech may still have insufficient pronunciation naturalness and insufficient expressiveness.

Therefore, the electronic device may further generate prosodic features associated with prosodic characteristics such as tone, intonation, stress and rhythm, and predict the pronunciation duration of the characters in the target text, so that in a subsequent speech synthesis process, more natural and more expressive synthetic speech can be obtained, and meanwhile, the prediction on the pronunciation duration of the characters can be more accurate.

In some embodiments, the electronic device predicts the pronunciation duration of each character in the target text, or the electronic device predicts the pronunciation duration of part of the characters in the target text, and this part of the characters may include a key character. For ease of description, the following embodiments take the prediction of the pronunciation duration of each character as an example to illustrate schematically.

The character may be an abstract graphic symbol that is recognizable in linguistics, the smallest distinguishing unit in writing. For example, the English letters "a, b, c", the Chinese characters "你, 我, 他", and the Japanese hiragana "あ, い, う".

In some embodiments, in the text, the characters may have corresponding pronunciation duration according to factors such as word characteristics, context and emotion. If the character does not need to be pronounced, the pronunciation duration may also be 0. The electronic device may predict duration needed for pronunciation of each character, so that the synthesized speech may have the more accurate pronunciation duration, and thus the final synthesized speech has a better effect.

In some embodiments, since the hidden layer features extracted based on the target text may be associated with the text characteristics such as character characteristics, character context association or character emotion, when the pronunciation duration of the characters is predicted, the prediction on the pronunciation duration of the character may be performed based on the hidden layer features, so as to predict the duration of the characters according to the factors such as character characteristics, context and emotion, to obtain a relatively accurate duration prediction effect.

Step 103. Generate acoustic features corresponding to the target text based on the hidden layer features, the prosodic features and the pronunciation duration.

In this embodiment of this application, after the pronunciation duration of the characters in the target text and the hidden layer features and the prosodic features of the target text are obtained, based on text related features implicitly included in the hidden layer features of the target text, prosody related features implicitly included in the prosodic features, and the pronunciation duration of the characters in the target text, sound waveform features corresponding to the target text can be generated, and the acoustic features can be obtained. In the process of speech synthesis, the prosodic features and the pronunciation duration of the characters are further considered based on the hidden layer features, so that the generated sound waveform features may have more accurate prosody and pronunciation duration, and synthesized speech may have better pronunciation naturalness and expressiveness.

The acoustic features may be waveform feature information of sound, for example, loudness and frequency information that change with time. The acoustic features may be expressed by using a frequency spectrogram, for example, a Melton spectrum, a linear spectrum, etc.

Step 104. Generate text speech corresponding to the target text according to the acoustic features.

In this embodiment of this application, since sound is waves generated by vibration of an object, after waveform features of the sound are obtained, a sound signal can be restored. Therefore, after the acoustic features corresponding to the target text are obtained, the electronic device may use the acoustic features corresponding to the target text to restore the sound signal, generates text speech corresponding to the target text, and complete speech synthesis of the target text.

Since in the process of speech synthesis, the duration of the target text is predicted based on the characters, meanwhile, the hidden layer features and the prosodic features are generated, and finally, based on the hidden layer features and the prosodic features of the target text and the pronunciation duration of the characters in the target text, the acoustic features corresponding to the target text are generated, and character level-based speech synthesis is completed; a speech database can be built without extracting a large number of words, phonemes, pauses and other information, so that the speech synthesis process is simpler, and the difficulty of speech synthesis is reduced; moreover, since further reference is made to the prosodic features and the pronunciation duration of the characters on the basis of the hidden layer features in the process of generating the acoustic features, the quality of speech synthesis can be further improved. In addition, in the face of personalized needs that a user needs to synthesize speech of different figures, personalized support for speech synthesis can also be simply completed.

To sum up, by using the speech synthesis method according to this embodiment of this application, the character-level speech synthesis is achieved by extracting the hidden layer features and the prosodic features in the text and predicting the speech duration based on the characters; under the condition of ensuring the quality of speech synthesis, the speech synthesis method does not need to preprocess a lot of materials compared with a phoneme-level speech synthesis solution, which is beneficial to reducing the difficulty of speech synthesis.

Figure 2:
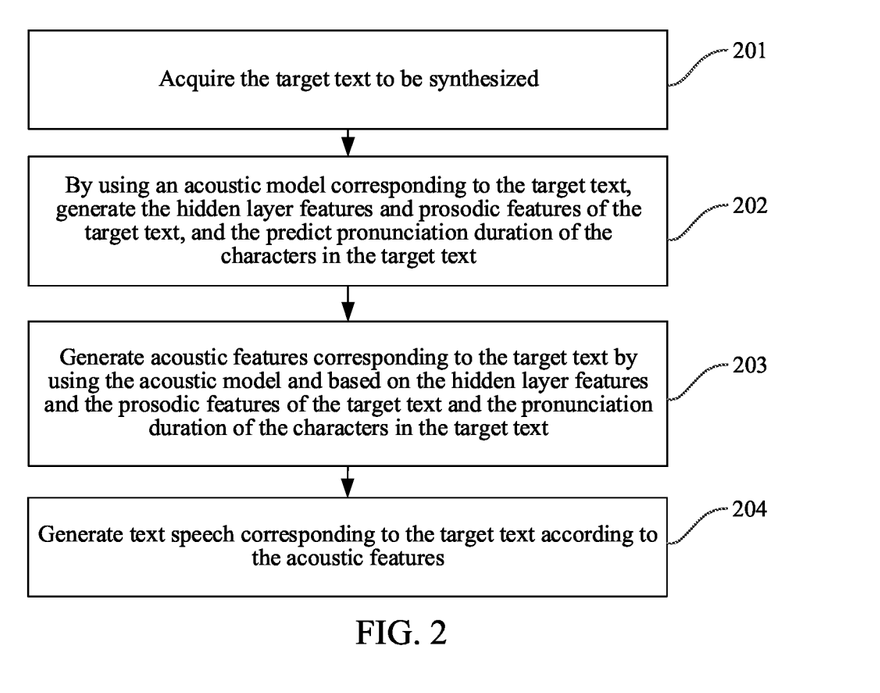
FIG. 2 is a flowchart of steps of another speech synthesis method according to an embodiment of this application.

Referring to FIG. 2, showing a flowchart of steps of a speech synthesis method embodiment according to this embodiment of this application, which may include the following steps:

Step 201. Acquire a target text to be synthesized into a speech.

Step 202. By using an acoustic model corresponding to the target text, generate hidden layer features and prosodic features of the target text, and predict pronunciation duration of characters in the target text.

In a possible implementation, the acoustic model may include a plurality of sub-models, where one sub-model may be used for presetting pronunciation duration of characters in the target text, one sub-model may be used for generating prosodic features of the target text, and one sub-model may be used for generating hidden layer features of the target text.

In a model training process, the sub-model used for predicting the duration of the characters may use the target text as input, and use the pronunciation duration of each character in the target text as output. The sub-model used for generating the prosodic features uses the target text as input, and uses the prosodic features of the target text as output.

The sub-model used for generating the hidden layer features uses the target text as input, and uses the hidden layer features of the target text as output.

In this embodiment of this application, there may be various types of acoustic models according to differences between speech samples used in the training process. In a possible implementation, the acoustic models may be applicable to various different kinds of languages, for example, the acoustic model applicable to Chinese, the acoustic model applicable to English, and the acoustic model applicable to Japanese. The acoustic models may also have personalized speech styles, for example, soprano, baritone, alto, bass, children's voice, the speech style of a specific cartoon figure, the speech style of a specific star, etc. In addition, since the acoustic model performs speech synthesis based on the characters, there is no need to extract the large number of words, phonemes, pauses and other information to build the speech library, so that the training process of the acoustic model can be relatively simple. Therefore, the acoustic models may be easily deployed according to the different needs of the users to meet the needs of speech of multiple languages and personalized styles.

In some embodiments, after acquiring the target text, the electronic device may also select, according to at least one requirement of the language and the speech style corresponding to the target text, the acoustic model applicable to the language and/or the speech style corresponding to the target text to process the target text, generate hidden layer features and prosodic features of the target text, and predict pronunciation duration of characters in the target text. In a subsequent acoustic feature generation process, the acoustic models applicable to the language and/or speech style may also be used for processing, so as to meet personalized needs of speech synthesis.

Step 203. Generate acoustic features corresponding to the target text by using the acoustic model and based on the hidden layer features and the prosodic features of the target text and the pronunciation duration of the characters in the target text.

In this embodiment of this application, after the pronunciation duration of the characters in the target text and the hidden layer features and the prosodic features of the target text are obtained, the acoustic features corresponding to the target text can be generated by using the acoustic model and based on the hidden layer features, the prosodic features and the pronunciation duration of the target text. The acoustic features may be waveform feature information of sound, for example, loudness and frequency information that changes with time. The acoustic features may be expressed by using a frequency spectrogram, for example, a Melton spectrum, a linear spectrum, etc.

In a possible implementation, the acoustic model may also include a sub-model used for generating acoustic features corresponding to the target text. In a model training process, the sub-model used for synthesizing the acoustic features corresponding to the target text may use the hidden layer features and the prosodic features of the target text and the pronunciation duration of the characters as input, and use the acoustic features corresponding to the target text as output, so as to obtain the sub-model used for synthesizing the acoustic features corresponding to the target text.

Step 204. Generate text speech corresponding to the target text according to the acoustic features.

An implementation of this step may refer to step 104 described above, and is not described again in this embodiment.

In an embodiment of this application, the acoustic model may be trained in the following manner:

S11. Acquire training text and training audio corresponding to the training text, where the training text uses a training language.

In this embodiment of this application, when the acoustic model of the certain language needs to be trained, the training text using this language and the training audio corresponding to the training text can be acquired.

The training language may be the language used in different regions, for example, Chinese, English, Japanese, Korean, or French; may also be a dialect as a subdivision of the certain language, for example, Hakka, or Cantonese.

S12. Train the acoustic model to be trained by using the training text and the training audio corresponding to the training text, to obtain a trained acoustic model of the training language.

In this embodiment of this application, the electronic device may train the acoustic model to be trained by using the training text corresponding to the training language and the training audio corresponding to the training text, to obtain the trained acoustic model of the training language. The trained acoustic model may be applicable to speech synthesis of this training language.

In a possible implementation, the acoustic model may take the form of an end-to-end model, sub-models included in the acoustic model may be mutually associated rather than independent, input of one sub-model may be output of another sub-model. In addition, the acoustic model may also be integrally trained in a training process; after the acoustic features finally outputted by the acoustic model are acquired, each sub-model in the acoustic model is adjusted based on the final output of the acoustic model, and a trained acoustic model of the training language is obtained.

In a possible implementation, the training text using the training language and the training audio corresponding to the training text include training text and training audio corresponding to the training text from several persons, that is, the training text and the training audio are from different pronunciation objects, so as to improve the generalization of the trained acoustic model to different pronunciation objects of the same language.

In some embodiments, training the acoustic model to be trained by using the training text and the training audio corresponding to the training text, to obtain a trained acoustic model of the training language includes the following steps:

S21. Train the acoustic model to be trained by using the training text and the training audio from the different pronunciation objects, to obtain a trained acoustic model of the training language.

In this embodiment of this application, the electronic device trains the acoustic model to be trained by using the training text of the plurality of pronunciation objects of the training language and the training audio corresponding to the training text, to obtain the trained acoustic model of the training language, so that the acoustic model can learn common pronunciation rules of the training language, an error rate of the acoustic model can be reduced, and the feature quality of the acoustic features outputted by the acoustic model can be improved.

S22. Train the acoustic model to be trained by using the training text of a target speech style in the training language and the training audio, to obtain the trained acoustic model of the target speech style.

In this embodiment of this application, the electronic device may further use the training text of the target speech style in the training language and the training audio corresponding to the training text to train the acoustic model based on the acoustic model which has trained by using the speech of the plurality of pronunciation objects, so as to obtain the acoustic model of the target speech style.

Since the acoustic model of the target speech style is obtained by further training based on the acoustic model which has trained by using the speech of the plurality of pronunciation objects, so that based on the speech synthesized based on the acoustic model of the target speech style, a relatively high pronunciation accuracy is provided while the target speech style is significantly achieved, and meanwhile, pronunciation quality may also be improved to a certain extent.

In this embodiment, the electronic device firstly trains the acoustic model based on the training text and the training audio from the different pronunciation objects, and then, on the basis of this acoustic model, further trains the acoustic model corresponding to the speech style based on the training text and the training audio of different speech styles, so that the synthesized speech has the specific speech style on the premise of ensuring the quality of speech synthesis.

Figure 3:
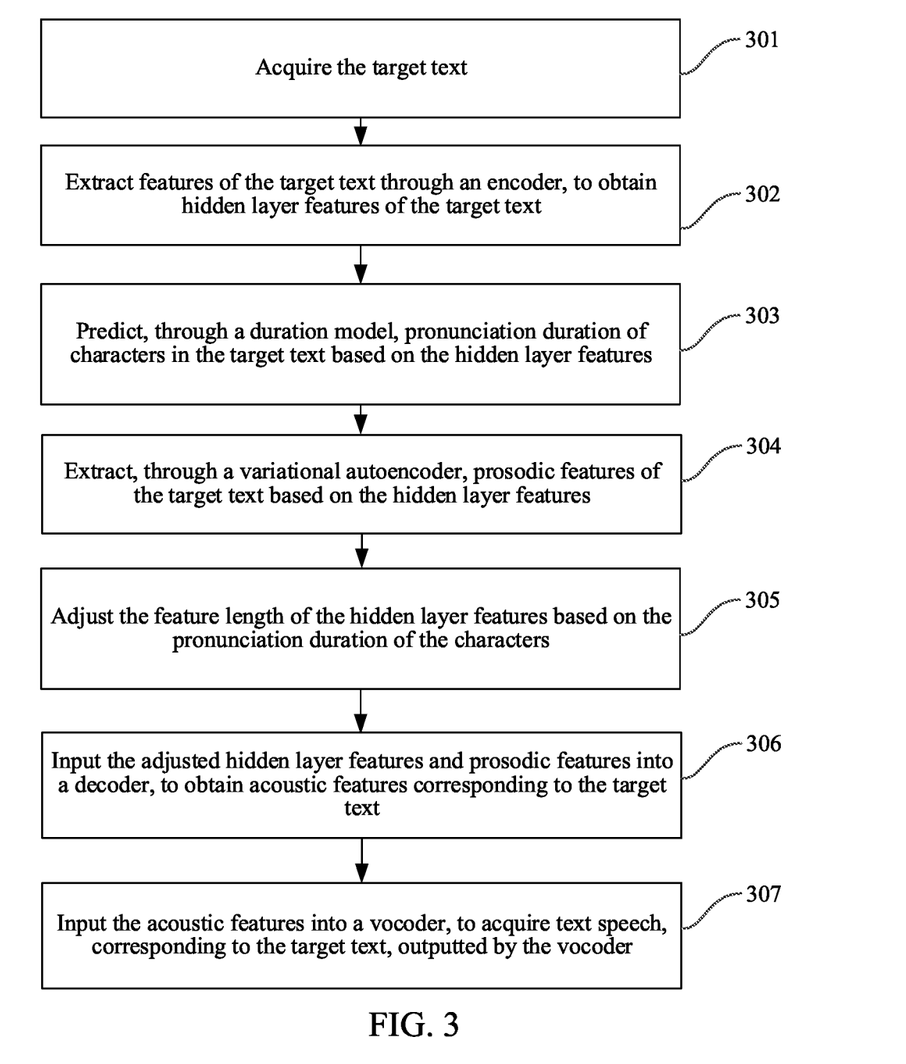
FIG. 3 is a flowchart of steps of another speech synthesis method according to an embodiment of this application.

Referring to FIG. 3, showing a flowchart of steps of a speech synthesis method embodiment according to this embodiment of this application, which may include the following steps:

Step 301. Acquire a target text to be synthesized into a speech.

In this embodiment of this application, an acoustic model may be used for completing speech synthesis. This acoustic model may include a plurality of sub-models. In a possible implementation, this acoustic model may include an encoder, a duration model, a variational autoencoder (VAE) and a decoder. The to-be-synthesized text needs to be processed by the encoder, the duration model, the variational autoencoder and the decoder, and finally acoustic features corresponding to the target text are obtained.

In a possible implementation, the acoustic model may be an end-to-end model, and in the acoustic model, the encoder, the duration model, the variational autoencoder and the decoder are mutually associated rather than independent. The encoder and the variational autoencoder may output an intermediate vector generated during model processing rather than independent results, and then the intermediate vector is further inputted into the decoder to obtain the acoustic features of the target text. The user may input the target text into the acoustic model, and thus the acoustic features outputted by the acoustic model may be directly obtained. By using the end-to-end model to generate the acoustic model, the structure of the acoustic model can be further simplified, and the efficiency of the acoustic model to convert the target text into the acoustic features can be improved.

Step 302. Extract features of the target text through an encoder, to obtain hidden layer features of the target text.

In this embodiment of this application, the encoder may learn potential information of the target text, output hidden layer features associated with text characteristics such as character characteristics, character context association or character emotion, so that the subsequent model may be further processed based on the hidden layer features The hidden layer features outputted by the encoder may be expressed in the vector form. Since the hidden layer features of the target text outputted by the encoder may be regarded as output of intermediate processing of the model, the hidden layer features may not be interpretable.

Step 303. Predict, through a duration model, pronunciation duration of characters in the target text based on the hidden layer features.

In a possible implementation, after the hidden layer features of the target text are acquired, the decoder corresponding to the encoder may be used for generating acoustic features corresponding to the target text according to the character characteristics implicitly included in the hidden layer features, such as character characteristics, character context association, character emotion, or character duration.

However, if only the encoder and the decoder are used for generating the acoustic features corresponding to the target text, usually synthesized speech with relatively good effect cannot be obtained, and the synthesized speech may still have insufficient pronunciation naturalness and insufficient expressiveness.

Therefore, to improve the quality of the synthesized speech, in another possible implementation, the electronic device may use the duration model to predict the pronunciation duration of the characters, so as to further improve the accuracy of the pronunciation duration of the characters in the synthesized speech, and improve pronunciation naturalness. After the hidden layer features are acquired, the hidden layer features may be inputted into the duration model, the duration model may predict the duration of speech corresponding to the characters in the synthesized text, that is, the pronunciation duration of the characters, through the information that is implicitly included in the hidden layer features and associated with the text characteristics, such as character characteristics, character context association, and character emotion.

Step 304. Extract, through the variational autoencoder, prosodic features of the target text based on the hidden layer features.

In this embodiment of this application, to further improve the pronunciation naturalness and expressiveness of the synthesized speech, the electronic device may further output prosodic features by the variational autoencoder based on the hidden layer features, so that in a subsequent speech synthesis process, the pronunciation naturalness and expressiveness of the synthesized speech can be improved based on the prosodic features.

In a possible implementation, while the hidden layer features are inputted into the duration model, the hidden layer features may further be inputted into the variational autoencoder, the variational autoencoder can learn potential representation of the state of a speaker in the target text, and output the prosodic features associated with prosodic characteristics, such as tone, intonation, stress, and rhythm. The prosodic features may be expressed in the vector form.

Step 305. Adjust the feature length of the hidden layer features based on the pronunciation duration of the characters.

In this embodiment of this application, the length of the hidden layer features may be associated with the pronunciation duration of the characters in the speech. To enable the decoder to generate the acoustic features with high pronunciation duration accuracy in the process of generating the acoustic features, the electronic device may adjust the length of the hidden layer features based on the pronunciation duration of the characters in the target text.

In a possible implementation, the feature length of the hidden layer features is positively correlated with the pronunciation duration, that is, the longer the pronunciation duration, the longer the corresponding hidden layer features.

For example, if the hidden layer features are "abc", the hidden layer features may be adjusted to "aaabbbccc" based on the pronunciation duration of the characters in the target text.

Step 306. Input the adjusted hidden layer features and prosodic features into a decoder, to obtain acoustic features corresponding to the target text.

In this embodiment of this application, the adjusted hidden layer features and the prosodic features of the target text may be inputted into the decoder, the decoder may generate acoustic features corresponding to the target text according to text characteristics implicitly included in the adjusted hidden layer features, such as character characteristics, character context association, character emotion, and character duration, and prosodic characteristics implicitly included in the prosodic features, such as tone, intonation, stress, and rhythm, where a decoding process of the decoder is a feature restoring process. Since the decoder further refers to the prosodic features outputted by the variational autoencoder to generate the acoustic features based on referring to the adjusted hidden layer features, the prosodic features of the synthesized speech can be more accurate, and the quality of the synthesized speech is further improved.

Step 307. Input the acoustic features into a vocoder to acquire text speech, corresponding to the target text, outputted by the vocoder.

In this embodiment of this application, after the acoustic features corresponding to the target text are obtained, the electronic device may input the acoustic features corresponding to the target text into a vocoder, and the vocoder generates text speech based on the acoustic features, and completes speech synthesis of the target text.

The vocoder may be a trained model used for converting acoustic features into speech. The vocoder may be a recurrent neural network, a source-filter based model, or the like, which is not limited in this embodiment of this application.

Figure 4:
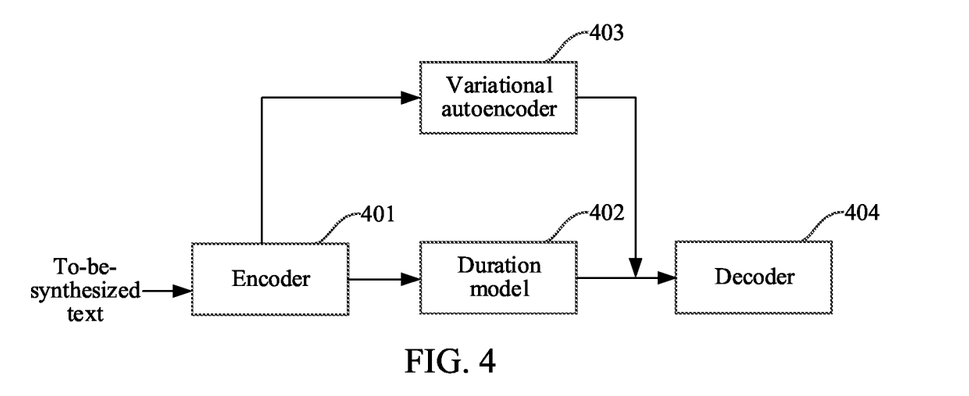
FIG. 4 is a schematic structural diagram of an acoustic model according to an embodiment of this application.

FIG. 4 is a schematic structural diagram of an acoustic model according to this embodiment of this application. The acoustic model may include an encoder 401, a duration model 402, a variational autoencoder 403 and a decoder 404. An electronic device inputs to-be-synthesized text into the encoder 401, to acquire hidden layer features outputted by the encoder 401. Thereafter, the hidden layer features may be inputted into the duration model 402, and pronunciation duration, outputted by the duration model 402, of each character in the target text is acquired. Meanwhile, the hidden layer features outputted by the encoder 401 may be inputted into the variational autoencoder 403, and prosodic features outputted by the variational autoencoder 403 are acquired. Thereafter, the pronunciation duration of each character in the target text may be used for adjusting the hidden layer features, the adjusted hidden layer features and the prosodic features of the target text are inputted into the decoder 404, and acoustic features, corresponding to the target text, outputted by the decoder 404, are acquired. Thereafter, a pre-trained vocoder may be used for processing the acoustic features, to obtain text speech corresponding to the target text.

In an embodiment of this application, the acoustic model may be trained in the following manner:

S31. Acquire training text and training audio corresponding to the training text.

In this embodiment of this application, the electronic device may acquire the training text and the training audio corresponding to the training text, where the training audio may be audio from different figures or a same figure in a same language. The training text may be words, short sentences, long sentences, articles, or the like of a language, which is not limited in this embodiment of this application.

S32. Extract target acoustic features of the training audio.

In this embodiment of this application, the electronic device may extract the target acoustic features of the training audio, to serve as a training objective of the overall acoustic model. The target acoustic features may be waveform feature information of sound, for example, loudness and frequency information that change with time. The acoustic features may be expressed by using a frequency spectrogram, for example, a Melton spectrum, a linear spectrum, etc.

In a possible implementation, the electronic device may use an acoustic feature extraction algorithm to extract target acoustic features of the training audio from the training audio. For example, a Mel frequency cepstrum coefficient (MFCC), a filter banks (FBank), a log filter banks (Log FBank) or the like may be used, which is not limited in this embodiment of this application.

S33. Input the training text into the acoustic model to be trained, to acquire acoustic features of the model outputted by the acoustic model to be trained.

In this embodiment of this application, the electronic device may input the training text into the acoustic model to be trained, and then after processing of the encoder, the duration model, the variational autoencoder and the decoder in the acoustic model, the model can output model acoustic features. The process of training the acoustic model is a process that the model acoustic features approach the target acoustic features.

In a possible implementation, when in training, the variational autoencoder may use the hidden layer features outputted by the encoder and the target acoustic features as input. The variational autoencoder may fit the target acoustic feature and the hidden layer feature outputted by the encoder into one value by two neural networks included therein, the variational autoencoder can learn this value; thereafter, in an application stage, after the hidden layer features outputted by the encoder are acquired, the variational autoencoder can correspondingly output prosodic features of the target text based on the hidden layer features and the learned value.

S34. Determine feature similarity between the model acoustic features and the target acoustic features.

In this embodiment of this application, the electronic device may determine whether the model acoustic features are close to the target acoustic features by calculating feature similarity between the model acoustic features and the target acoustic features, and then determine whether the acoustic model has been trained.

In a possible implementation, when the acoustic features are expressed vectorially, the electronic device can calculate a vector distance between the model acoustic features and the target acoustic features, so that the vector distance is determined as the feature similarity.

S35. Adjust model parameters of the acoustic model to be trained based on the feature similarity, and complete training of the acoustic model.

In this embodiment of this application, the electronic device may adjust the model parameters of the acoustic model to be trained based on the feature similarity (as a loss function) between the model acoustic features and the target acoustic features, so that the model acoustic features outputted by the acoustic model can continuously approach the target acoustic features.

In a possible implementation, the electronic device may adjust model parameters of the acoustic model by using a gradient descent or back propagation algorithm.

Thereafter, if the feature similarity between the model acoustic features and the target acoustic features meets a preset condition, it can be considered that the acoustic model has been trained.

The preset condition may be that the feature similarity between the model acoustic features and the target acoustic features is higher than a preset threshold. The similarity between the model acoustic features and the target acoustic features basically does not change, which is not limited in this embodiment of this application.

To further improve the authenticity of the synthesized speech, the idea of a generative adversarial network (GAN) may also be introduced in the process of training the acoustic model. In a possible implementation, after the model acoustic features are obtained through the acoustic model, the electronic device inputs the model acoustic features into the vocoder and acquires synthesized audio outputted by the vocoder.

Furthermore, the electronic device inputs the synthesized audio and the training audio into a discriminator, to obtain a first discrimination result corresponding to the synthesized audio and a second discrimination result corresponding to the training audio, where the discriminator is used for determining that the input audio is the training audio or the synthesized audio, that is, used for distinguishing real audio and generated audio.

In a model training process, in addition to taking the feature similarity as a part of losses, the electronic device further takes distinguishing losses of the discriminator as a part of the losses, so as to adjust, based on the feature similarity, the first discrimination result and the second discrimination result, model parameters of the acoustic model to be trained and the discriminator, and complete training of the acoustic model.

In a possible implementation, in the case that the acoustic model and the discriminator form the generative adversarial network, gradient update is performed on the model parameters of the acoustic model are based on the feature similarity losses, and the accuracy of the acoustic model to generate the model acoustic feature is improved. In addition, the discriminator is adjusted based on the distinguishing losses to improve the ability thereof to distinguish the model acoustic features and the target acoustic features. The acoustic model and the discriminator may fight against each other to improve output accuracy of the model, and finally the acoustic model with high accuracy can be obtained.

In this embodiment of this application, by integrally training sub-models in the acoustic model, the sub-models in the acoustic model are trained based on the final output of the acoustic model, so that the sub-models in the acoustic model can have a same training objective; therefore, the sub-models in the acoustic model can have better integrating degrees therebetween, and a better speech synthesis effect can be obtained. Using the generative adversarial network to train the acoustic model can further improve the effect of the acoustic model, and make the finally generated synthesized speech more real.

In an embodiment of this application, the duration model may be trained in the following manner:

S41. Extract standard duration of characters in the training audio.

In this embodiment of this application, the electronic device may further train the duration model based on overall training of the acoustic model, to improve the accuracy of the duration model to predict the pronunciation duration of the characters, so that the output of the acoustic model can be more accurate.

The standard duration of the characters in the training audio extracted by the electronic device can be regarded as the correct pronunciation duration of the characters. Extraction of the standard duration of the characters in the training audio can be carried out by using the model or carried out manually, which is not limited in this embodiment of this application.

S42. Input the training text into the encoder, to acquire the hidden layer features outputted by the encoder.

In this embodiment of this application, the input of the duration model may be the output of the encoder. Therefore, the training text may be inputted into the encoder, and the hidden layer features outputted by the encoder can be acquired to train the duration model.

S43. Take the hidden layer features as the input of the duration model, and take the standard duration of the characters in the training audio as a training objective, to train the duration model.

In this embodiment of this application, the electronic device may input the hidden layer features into the duration model, to obtain predicted duration outputted by the duration model, so that the standard duration of the characters in the training audio is used as supervision of the predicted duration, and the duration model is trained to obtain a trained duration model. By further training the duration model, output accuracy of the duration model can be further improved, so that the finally synthesized speech can have better quality.

In a possible implementation, the electronic device may input the hidden layer features into the duration model, and the duration model may output predicted duration of the characters in the training text. Thereafter, the electronic device may determine a duration difference between the predicted duration outputted the duration model and the standard duration of the characters in the training audio, and adjust model parameters of the duration model according to the duration difference, until the output of the duration model meets a preset condition, and thus training of the duration model is completed.

The preset condition may be that the difference between the predicted duration outputted by the duration model and the standard duration is less than a preset threshold, may also be that the difference between the predicted duration outputted by the duration model and the standard duration basically does not change, or the like, which is not limited in this embodiment of this application.

In an embodiment of this application, extracting standard duration of characters in the training audio includes:

S51. Mark, through a segmentation model, a pronunciation start and a pronunciation end of each character in the training audio based on the training audio and the hidden layer features.

In this embodiment of this application, during a training process, the duration model may be trained by using the segmentation model. The segmentation model may be used for segmenting each character in the training text, and correspondingly mark the pronunciation start and the pronunciation end of each character in the training audio, so that the pronunciation duration corresponding to each character in the training text can be known. It can be considered that the character duration outputted by the segmentation model is the correct character duration, so that the duration model may be trained based on the output of the segmentation model.

Thereafter, the electronic device may input the training audio and the hidden layer features into the segmentation model, to acquire the output of the segmentation model.

In this embodiment of this application, the segmentation model may predict the character corresponding to each frame of the training audio based on the hidden layer feature. Thereafter, the earliest frame corresponding to the character may be used as the pronunciation start of the character in the training audio, and the latest frame corresponding to the character may be used as the pronunciation end of the character in the training audio, so that the pronunciation start and the pronunciation end of each character in the training audio can be marked.

In some embodiments, the target acoustic features may be recorded with changes in frequency and loudness of the training audio over successive duration. Thereafter, the segmentation model may predict the character corresponding to each frame in the target acoustic features based on the target acoustic features, and mark the start and the end of each character.

S52. Determine standard duration of the character in the training audio based on the pronunciation start and the pronunciation end of each character in the training audio.

In a possible implementation, the electronic device may use a time difference between the pronunciation start and the pronunciation end of the character as the standard duration corresponding to the character, so that the standard duration of each character in the training audio can be obtained.

In some embodiments, during the training process of the acoustic model, the model parameters of the segmentation model may also be adjusted based on the feature similarity between the model acoustic features and the target acoustic features. Therefore, in the training process, the segmentation model may also continuously improve the accuracy of segmentation of each character in the training text and the accuracy of determination of the duration of each character. Thus, in the training process, the duration model may also acquire the more accurate training objective, which can improve the output accuracy of the duration model, and enable the acoustic features finally outputted by the acoustic model to have higher accuracy.

Therefore, the acoustic model may achieve end-to-end learning; each sub-model in the acoustic model and the segmentation model may be trained based on the acoustic features finally outputted by the acoustic model, and the acoustic model with relatively high accuracy can be obtained. In addition, during the process, since the acoustic model and the segmentation model are trained through adversarial training, and the output of the segmentation model is used for training the duration model, so that training of the acoustic model can be completed without manual supervision or less manual supervision during the training process, which is convenient for the acoustic model to easily adapt to the needs of multiple languages and different pronunciation objects.

Figure 5:
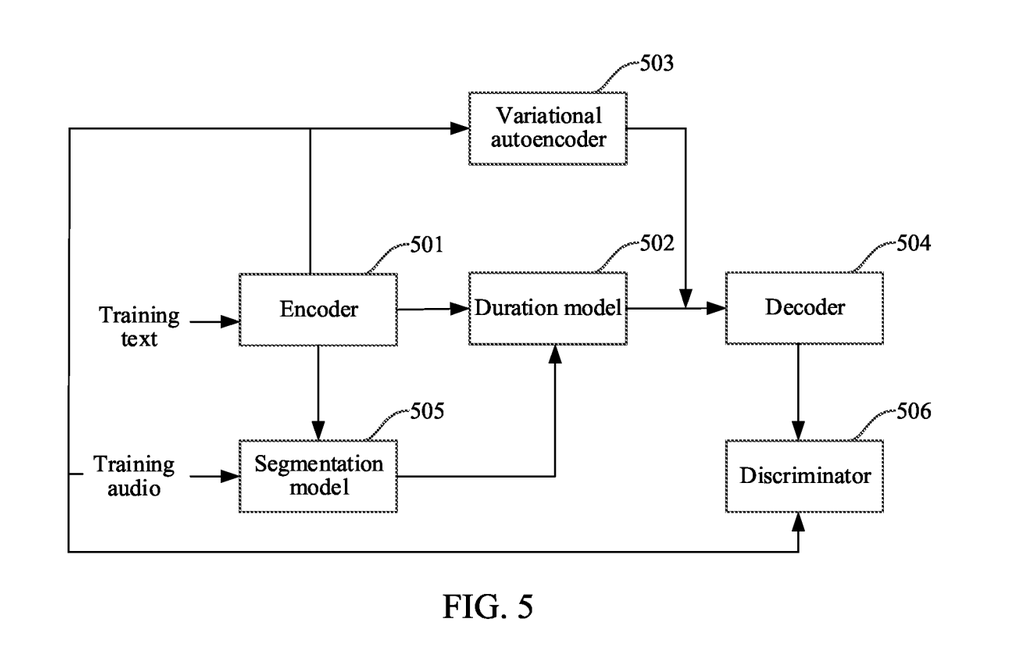
FIG. 5 is a schematic diagram of training of an acoustic model according to an embodiment of this application.

FIG. 5 is a schematic diagram of training of an acoustic model according to an embodiment of this application. In a training process, training text may be inputted into an encoder 501, and hidden layer features outputted by the encoder 501 can be acquired; and then, the hidden layer features may be inputted into a duration model 502, and duration of each character outputted by the duration model 502 can be acquired. The hidden layer features and target acoustic features may be further inputted into a segmentation model 505, to acquire standard duration outputted by the segmentation model 505. The standard duration outputted by the segmentation model 505 may be used as a training objective of the duration model 502, and the hidden layer features may be used as input of the duration model 502, to train the duration model 502.

Meanwhile, the hidden layer features and the target acoustic features extracted from the training audio may be further inputted into a variational autoencoder 503, and prosodic features outputted by the variational autoencoder 503 are acquired. Thereafter, the decoder 504 may output model acoustic features based on the hidden layer features, the duration of each character and the prosodic features. Thereafter, a discriminator 506 may be used for distinguishing synthesized audio corresponding to the model acoustic features and the training audio, and determine feature similarity between the model acoustic features and the target acoustic features; and meanwhile, model parameters of each sub-model of the acoustic model to be trained and parameters of the discriminator are adjusted to finally obtain acoustic features that have been trained.

The method embodiments are expressed as a series of action combinations for the purpose of brief description, but a person skilled in the art is to know that because some steps may be performed in other sequences or simultaneously according to the embodiments of this application, the embodiments of this application are not limited to a described action sequence. In addition, a person skilled in the art is also to know that the embodiments described in this specification are all preferred embodiments; and therefore, an action involved is not necessarily mandatory in the embodiments of this application.

Figure 6:
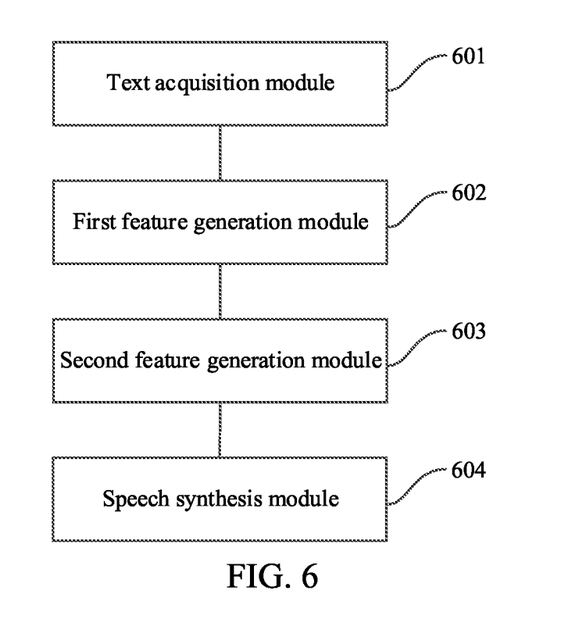
FIG. 6 is a structural block diagram of a speech synthesis apparatus embodiment according to an embodiment of this application.

Referring to FIG. 6, which shows a structural block diagram of a speech synthesis apparatus according to an embodiment of this application. The apparatus may include the following modules:

a text acquisition module 601, configured to acquire a target text to be synthesized into a speech;

a first feature generation module 602, configured to generate hidden layer features and prosodic features of the target text, and predict pronunciation duration of characters in the target text;

a second feature generation module 603, configured to generate acoustic features corresponding to the target text based on the hidden layer features, the prosodic features and the pronunciation duration; and a speech synthesis module 604, configured to generate text speech corresponding to the target text according to the acoustic features.

In an embodiment of this application, the first feature generation module 602 is configured to:

use an acoustic model corresponding to the target text to generate the hidden layer features and the prosodic features, and predict the pronunciation duration, where the acoustic model is determined based on at least one of a language and a speech style corresponding to the target text.

In an embodiment of this application, the acoustic model includes an encoder, a duration model and a variational autoencoder, and the first feature generation module 602 is configured to:

extract features of the target text through the encoder, to obtain hidden layer features of the target text;

predict, through the duration model, the pronunciation duration of the characters in the target text based on the hidden layer features; and extract, through the variational autoencoder, prosodic features of the target text based on the hidden layer features.

In an embodiment of this application, the acoustic model includes a decoder, and the second feature generation block 603 is configured to:

adjust the feature length of the hidden layer features based on the pronunciation duration; and input the adjusted hidden layer features and the prosodic features into the decoder, to obtain the acoustic features corresponding to the target text.

In an embodiment of this application, the speech synthesis module 604 is configured to:

input the acoustic features into a vocoder, to acquire text speech, corresponding to the target text, outputted by the vocoder.

In an embodiment of this application, the acoustic model is trained by using the following modules:

a training module, configured to acquire training text and training audio corresponding to the training text, where the training text uses a training language; and train the acoustic model to be trained by using the training text and the training audio, to obtain a trained acoustic model of the training language.

In an embodiment of this application, the training text and the training audio are from different pronunciation objects; and the training module is configured to:

train the acoustic model to be trained by using the training text and the training audio from different pronunciation objects, to obtain the trained acoustic model of the training language; and train the acoustic model to be trained by using the training text and the training audio of a target speech style in the training language, to obtain the trained acoustic model of the target speech style.

In an embodiment of this application, the training module is configured to:

extract target acoustic features of the training audio;

input the training text into the acoustic model to be trained, to acquire model acoustic features outputted by the acoustic model to be trained;

determine feature similarity between the model acoustic features and the target acoustic features; and adjust model parameters of the acoustic model to be trained based on the feature similarity, and complete training of the acoustic model.

In an embodiment of this application, the training module is further configured to:

input the model acoustic features into a vocoder, to acquire synthesized audio outputted by the vocoder;

input the synthesized audio and the training audio into a discriminator, to obtain a first discrimination result corresponding to the synthesized audio and a second discrimination result corresponding to the training audio, where the discriminator is used for determining that the input audio is the training audio or the synthesized audio; and adjust model parameters of the acoustic model to be trained and the discriminator based on the feature similarity, the first discrimination result and the second discrimination result, and complete training of the acoustic model.

In an embodiment of this application, the acoustic model to be trained includes an encoder and a duration model;

the training module is further configured to:

extract standard duration of the characters in the training audio;

input the training text into the encoder, to acquire hidden layer features, outputted by the encoder, of the training text; and take the hidden layer features as input of the duration model, and take the standard duration of the characters in the training audio as a training objective, to train the duration model.

In an embodiment of this application, the training module is further configured to:

mark, through a segmentation model, a pronunciation start and a pronunciation end of each character in the training audio based on the training audio and the hidden layer features; and determine standard duration of the characters in the training audio based on the pronunciation start and the pronunciation end of the characters in the training audio.

An apparatus embodiment is basically similar to a method embodiment, and therefore is described briefly. For related parts, refer to partial descriptions in the method embodiment.

Figure 7:
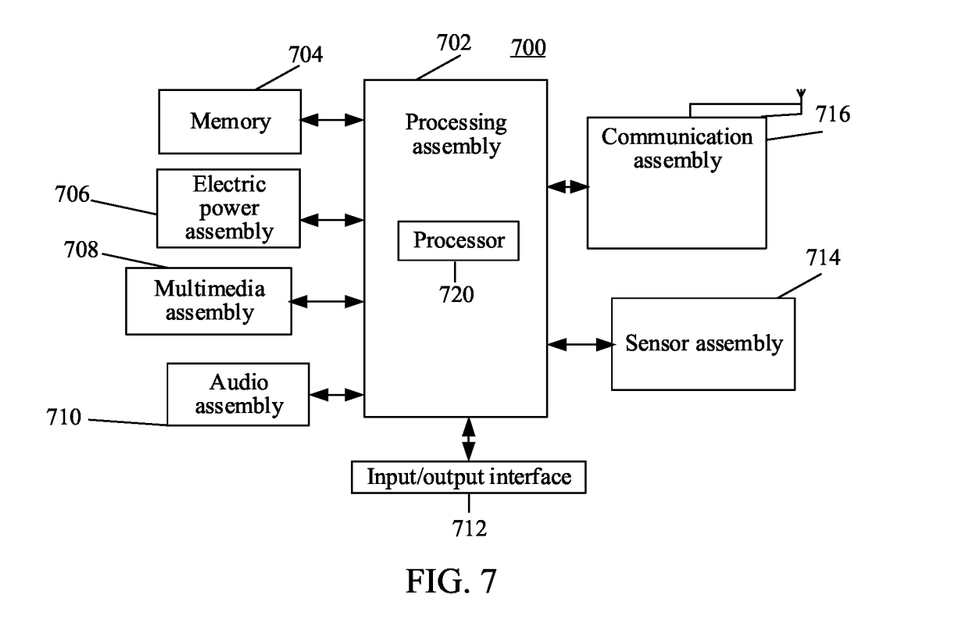
FIG. 7 is a structural block diagram of an electronic device according to an exemplary embodiment of this application.

Referring to FIG. 7, an electronic device 700 may include one or more of the following assemblies: a processing assembly 702 and a memory 704.

The processing assembly 702 usually controls the whole operation of the electronic device 700, such as operations associated with displaying, a phone call, data communication, a camera operation, and a recording operation. The processing element 702 may include one or more processing units 720 to execute instructions, to complete all or some steps of the foregoing method. In addition, the processing assembly 702 may include one or more modules, to facilitate the interaction between the processing assembly 702 and other assemblies. For example, the processing component 702 may include a multimedia module, to facilitate the interaction between a multimedia assembly 708 and the processing assembly 702.

The memory 704 is configured to store various types of data to support operations on the device 700. Examples of the data include instructions, contact data, phonebook data, messages, pictures, videos, and the like of any application program or method used to be operated on the electronic device 700. The memory 704 may be implemented by any type of volatile or non-volatile storage devices or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disc, or an optical disc.

In some embodiments, the electronic device 700 may further include an electric power assembly 706, a multimedia assembly 708, an audio assembly 710, an input/output (I/O) interface 712, a sensor assembly 714, and a communication assembly 716, which is not limited in this embodiment.

In an exemplary embodiment, the electronic device 700 may be implemented by one or more application specific integrated circuits (ASICs), a digital signal processing unit (DSP), a digital signal processing device (DSPD), programmable logic device (PLD), field programmable gate array (FPGA), a controller, a micro-controller, a microprocessing unit or other electronic element, so as to perform the foregoing method.

In an exemplary embodiment, further provided is a non-transitory computer-readable storage medium including instructions, for example, a memory 704 including instructions, and the instructions can be executed by the processing unit 720 of the electronic device 700 to implement the foregoing method. For example, the non-transitory computer-readable storage medium may be a ROM, a random access memory (RAM), a CD-ROM, a magnetic tape, a floppy disk, an optical data storage device, or the like.

A non-transitory computer-readable storage medium, where instructions in the storage medium, when executed by a processing unit of an electronic device, causes the electronic device to execute the speech synthesis method provided by each embodiment described above.

Figure 8:
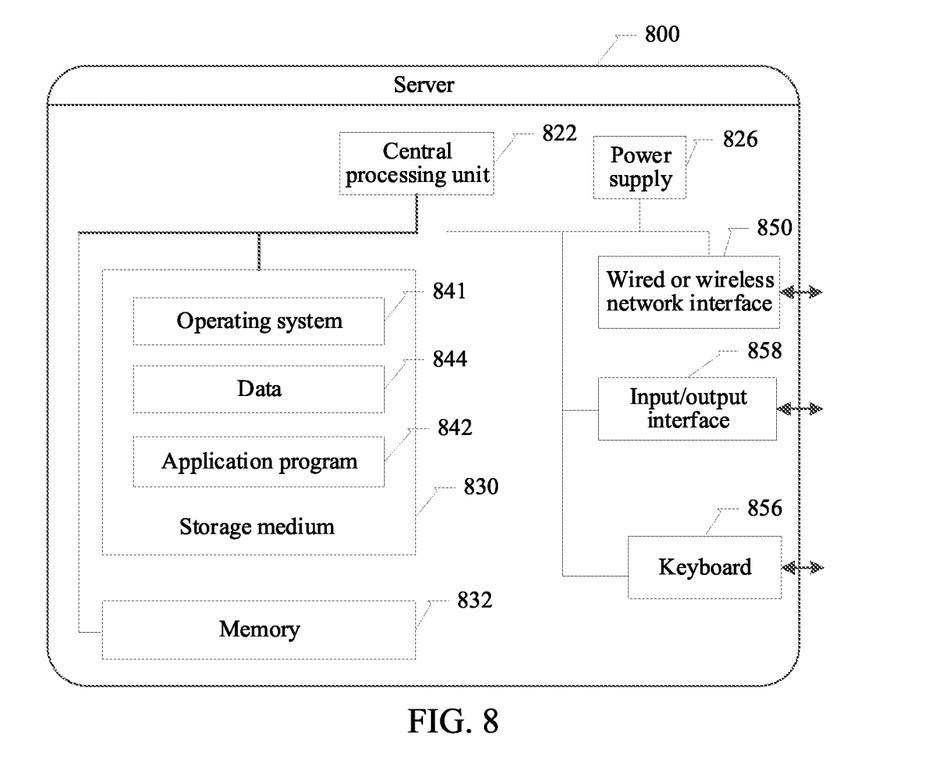
FIG. 8 is a schematic structural diagram of an electronic device according to another exemplary embodiment of this application.

FIG. 8 is a schematic structural diagram of an electronic device 800 according to another exemplary embodiment. The electronic device 800 may be a server, and the server may greatly differ as configuration or performance differs, may include one or more central processing units (CPUs) 822 (for example, one or more processing units), a memory 832, and one or more storage mediums 830 storing an application program 842 or data 844 (for example, one or more mass storage devices). The memory 832 and the storage medium 830 may be used for transient storage or permanent storage. A program stored in the storage medium 830 may include one or more modules (which are not marked in the figure), and each module may include a series of instruction operations on the server. Furthermore, the central processing unit 822 may be configured to communicate with the storage medium 830, and execute, on the server, a series of instruction operations in the storage medium 830.

The server may further include one or more power supplies 826, one or more wired or wireless network interfaces 850, one or more input/output interfaces 858, one or more keyboards 856, and/or, one or more operating systems 841, for example, Windows Server™, Mac OS X™, Unix™, Linux™, FreeBSD™, etc.

An electronic device includes a memory and one or more programs, where the one or more programs are stored in the memory, and the one or more programs are configured to be executed by one or more processing units, to implement the speech synthesis method provided by each embodiment described above.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The speech synthesis method and apparatus provided by this application are described in detail above. The principle and implementations of this application are described in this specification by using specific examples. The descriptions of the foregoing embodiments are merely used for helping understand the method and core ideas of this application. In addition, a person skilled in the art can make variations to this application in terms of the specific implementations and application scopes according to the ideas of this application. To conclude, the content of the specification is not to be construed as a limitation to this application.

What is claimed is:

1. A speech synthesis method comprising:
   acquiring a target text to be synthesized into a speech;
   generating hidden layer features and prosodic features of the target text and predicting pronunciation duration of characters in the target text using an acoustic model corresponding to the target text, wherein the acoustic model comprises an encoder, a duration model, and a variational autoencoder, the generating further including:
   extracting features of the target text through the encoder, to obtain hidden layer features of the target text;
   predicting, through the duration model, the pronunciation duration of the characters in the target text based on the hidden layer features; and
   extracting, through the variational autoencoder, the prosodic features of the target text based on the hidden layer features;
   generating acoustic features corresponding to the target text based on the hidden layer features, the prosodic features and the pronunciation duration; and
   synthesizing a target speech corresponding to the target text according to the acoustic features.

2. The method according to claim 1, wherein the method further comprises determining the acoustic model based on at least one of a language and a speech style corresponding to the target text, and the acoustic model used in the generating and predicting step is the determined acoustic model.

3. The method according to claim 1, wherein the acoustic model further comprises a decoder; and
   the generating acoustic features corresponding to the target text based on the hidden layer features, the prosodic features and the pronunciation duration comprises:
   adjusting the hidden layer features based on the pronunciation duration; and
   inputting the adjusted hidden layer features and the prosodic features into the decoder, to obtain the acoustic features corresponding to the target text.

4. The method according to claim 1, wherein the synthesizing a target speech corresponding to the target text according to the acoustic features comprises:
   input the acoustic features into a vocoder, to acquire the target speech corresponding to the target text.

5. The method according to claim 1, wherein the acoustic model is trained in the following manner:
   acquiring training text and training audio corresponding to the training text, wherein the training text and the training audio use one training language; and
   training the acoustic model by using the training text and the training audio, to obtain a trained acoustic model of the training language.

6. The method according to claim 5, wherein the training the acoustic model by using the training text and the training audio, to obtain a trained acoustic model of the training language comprises:
   extracting target acoustic features of the training audio;
   input the training text into the acoustic model, to acquire model acoustic features corresponding to the training text;
   determining feature similarity between the model acoustic features and the target acoustic features; and
   adjusting model parameters of the acoustic model based on the feature similarity.

7. An electronic device, comprising a memory, one or more processing units, and one or more programs, wherein the one or more programs are stored in the memory and executed by the one or more processing units to perform a speech synthesis method including:
   acquiring a target text to be synthesized into a speech;

generating hidden layer features and prosodic features of the target text and predicting pronunciation duration of characters in the target text using an acoustic model corresponding to the target text, wherein the acoustic model comprises an encoder, a duration model, and a variational autoencoder, the generating further including:

extracting features of the target text through the encoder, to obtain hidden layer features of the target text;

predicting, through the duration model, the pronunciation duration of the characters in the target text based on the hidden layer features; and extracting, through the variational autoencoder, the prosodic features of the target text based on the hidden layer features;

generating acoustic features corresponding to the target text based on the hidden layer features, the prosodic features and the pronunciation duration; and synthesizing a target speech corresponding to the target text according to the acoustic features.

8. The electronic device according to claim 7, wherein the speech synthesis method further comprises determining the acoustic model based on at least one of a language and a speech style corresponding to the target text, and the acoustic model used in the generating and predicting step is the determined acoustic model.

9. The electronic device according to claim 7, wherein the acoustic model further comprises a decoder; and the generating acoustic features corresponding to the target text based on the hidden layer features, the prosodic features and the pronunciation duration comprises:

adjusting the hidden layer features based on the pronunciation duration; and inputting the adjusted hidden layer features and the prosodic features into the decoder, to obtain the acoustic features corresponding to the target text.

10. The electronic device according to claim 7, wherein the synthesizing a target speech corresponding to the target text according to the acoustic features comprises:

input the acoustic features into a vocoder, to acquire the target speech corresponding to the target text.

11. The electronic device according to claim 7, wherein the acoustic model is trained in the following manner:

acquiring training text and training audio corresponding to the training text, wherein the training text and the training audio use one training language; and training the acoustic model by using the training text and the training audio, to obtain a trained acoustic model of the training language.

12. The electronic device according to claim 11, wherein the training the acoustic model by using the training text and the training audio, to obtain a trained acoustic model of the training language comprises:

extracting target acoustic features of the training audio;

input the training text into the acoustic model, to acquire model acoustic features corresponding to the training text;

determining feature similarity between the model acoustic features and the target acoustic features; and adjusting model parameters of the acoustic model based on the feature similarity.

13. A non-transitory computer-readable storage medium storing one or more programs, the one or more programs, when executed by one or more processing units of an electronic device, causing the electronic device to perform a speech synthesis method including:

acquiring a target text to be synthesized into a speech;

generating hidden layer features and prosodic features of the target text and predicting pronunciation duration of characters in the target text using an acoustic model corresponding to the target text, wherein the acoustic model comprises an encoder, a duration model, and a variational autoencoder, the generating further including:

extracting features of the target text through the encoder, to obtain hidden layer features of the target text;

predicting, through the duration model, the pronunciation duration of the characters in the target text based on the hidden layer features; and extracting, through the variational autoencoder, the prosodic features of the target text based on the hidden layer features;

generating acoustic features corresponding to the target text based on the hidden layer features, the prosodic features and the pronunciation duration; and synthesizing a target speech corresponding to the target text according to the acoustic features.

14. The non-transitory computer-readable storage medium according to claim 13, wherein the speech synthesis method further comprises determining the acoustic model based on at least one of a language and a speech style corresponding to the target text, and the acoustic model used in the generating and predicting step is the determined acoustic model.

15. The non-transitory computer-readable storage medium according to claim 13, wherein the acoustic model further comprises a decoder; and the generating acoustic features corresponding to the target text based on the hidden layer features, the prosodic features and the pronunciation duration comprises:

adjusting the hidden layer features based on the pronunciation duration; and inputting the adjusted hidden layer features and the prosodic features into the decoder, to obtain the acoustic features corresponding to the target text.

16. The non-transitory computer-readable storage medium according to claim 13, wherein the synthesizing a target speech corresponding to the target text according to the acoustic features comprises:

input the acoustic features into a vocoder, to acquire the target speech corresponding to the target text.

17. The non-transitory computer-readable storage medium according to claim 13, wherein the acoustic model is trained in the following manner:

acquiring training text and training audio corresponding to the training text, wherein the training text and the training audio use one training language; and training the acoustic model by using the training text and the training audio, to obtain a trained acoustic model of the training language.

* * * * *